US005488338A

United States Patent [19]

Seymour et al.

[11] Patent Number: 5,488,338

[45] Date of Patent: Jan. 30, 1996

[54] ELECTRONIC TRIP ASSEMBLY FOR HIGH AMPERE-RATED CIRCUIT BREAKER

[75] Inventors: Raymond K. Seymour; Paul T. Rajotte, both of Plainville; Elaine B. Bogue, Stonington, all of Conn.

[73] Assignee: General Electric Company, New York, N.Y.

[21] Appl. No.: 248,908

[22] Filed: May 25, 1994

[51] Int. Cl.[6] .......... H01M 9/02

[52] U.S. Cl. .......... 335/202; 335/132

[58] Field of Search .......... 335/6, 132, 202, 335/18, 200; 200/293, 303, 307

[56] References Cited

U.S. PATENT DOCUMENTS

| | | | |
|---|---|---|---|
| 4,001,742 | 1/1977 | Jencks et al. . | |
| 4,672,501 | 6/1987 | Bilac et al. . | |
| 4,728,914 | 3/1988 | Morris et al. . | |
| 4,870,531 | 9/1989 | Danek . | |
| 4,991,042 | 2/1991 | Tokarski et al. | 361/93 |
| 5,303,113 | 4/1993 | Goleman et al. | 361/93 |

*Primary Examiner*—Lincoln Donovan
*Attorney, Agent, or Firm*—Richard A. Menelly

[57] ABSTRACT

A high ampere-rated circuit breaker which meets the electrical code requirements of the world market. The electronic trip unit is contained within the circuit breaker cover and is configured to prevent access to the accessory unit selection switches. Rejection pins on the back of the trip unit insure correct correlation between the trip unit and circuit breaker ratings.

19 Claims, 3 Drawing Sheets

20

ELECTRONIC TRIP ASSEMBLY FOR HIGH AMPERE-RATED CIRCUIT BREAKER

BACKGROUND OF THE INVENTION

U.S. Pat. No. 4,001,742 entitled "Circuit Breaker Having Improved Operating Mechanism" describes a circuit breaker capable of interrupting several thousand amperes of circuit current at several hundred volts potential. As described therein, the operating mechanism is in the form of a pair of powerful operating springs that are restrained from separating the circuit breaker contacts by means of a latching system. Once the operating mechanism has responded to separate the contacts, the operating springs must be recharged to supply sufficient motive force to the movable contact arms that carry the contacts.

U.S. Pat. No. 4,672,501 entitled "Circuit Breaker and Protective Relay Unit" describes the use of a digital circuit interrupter employing a microprocessor in combination with ROM and RAM memory elements to provide both relaying as well as protection function to an electrical distribution system.

This circuit breaker and protective relay unit can be used on various ampere-rated circuit breakers depending on the operator's requirements. This invention provides a trip unit rejection scheme whereby only the correct trip unit is installable within the corresponding circuit breaker assembly.

U.S. Pat. No. 4,870,531 entitled "Circuit Breaker with Removable Display and Keypad" describes a digital display and keypad used to select circuit breaker trip settings and allows the settings to be viewed.

This invention allows use of the display and keypad assembly remote from the circuit breaker to display the circuit breaker trip settings as well as cause-of-trip information.

U.S. patent application Ser. No. 08/239,822 entitled "Digital Circuit Interrupter with Multiple Accessory Function" describes an integrated circuit breaker having several accessory functions along with automatic overcurrent protection, which allows selection between the various accessory functions in different combinations. Separate switches are arranged on the circuit breaker to allow factory as well as field selection of the accessory function combinations.

When such switches are set by the operator within an electrical distribution system, it is important that the switches not be changed so that selected accessories such as a bell alarm remain operational at all times.

U.S. patent application Ser. No. 08/200,048 filed Feb. 22, 1994 entitled "Digital Circuit Interrupter with Battery Back-up Facility" describes a digital circuit interrupter utilizing current transformers for operating power that includes a battery to power-up the trip unit as well as to power the display after an overcurrent trip occurrence to enable an operator to determine both the magnitude as well as the cause of the overcurrent condition.

One purpose of this invention is to provide access means to the batteries used within the battery recess in the trip unit cover to allow for test and replacement.

SUMMARY OF THE INVENTION

The accessory unit selection switches are arranged on the back cover of the electronic trip unit within the circuit breaker cover to prevent access to the accessory settings. Rejection pins on the back of the trip unit insure correct correlation between the trip unit and circuit breaker ratings. A supplemental cover over the trip unit is apertured to provide visual access to the trip unit display while preventing access to the trip unit entry key.

DESCRIPTION OF THE PREFERRED EMBODIMENT

Figure 1:
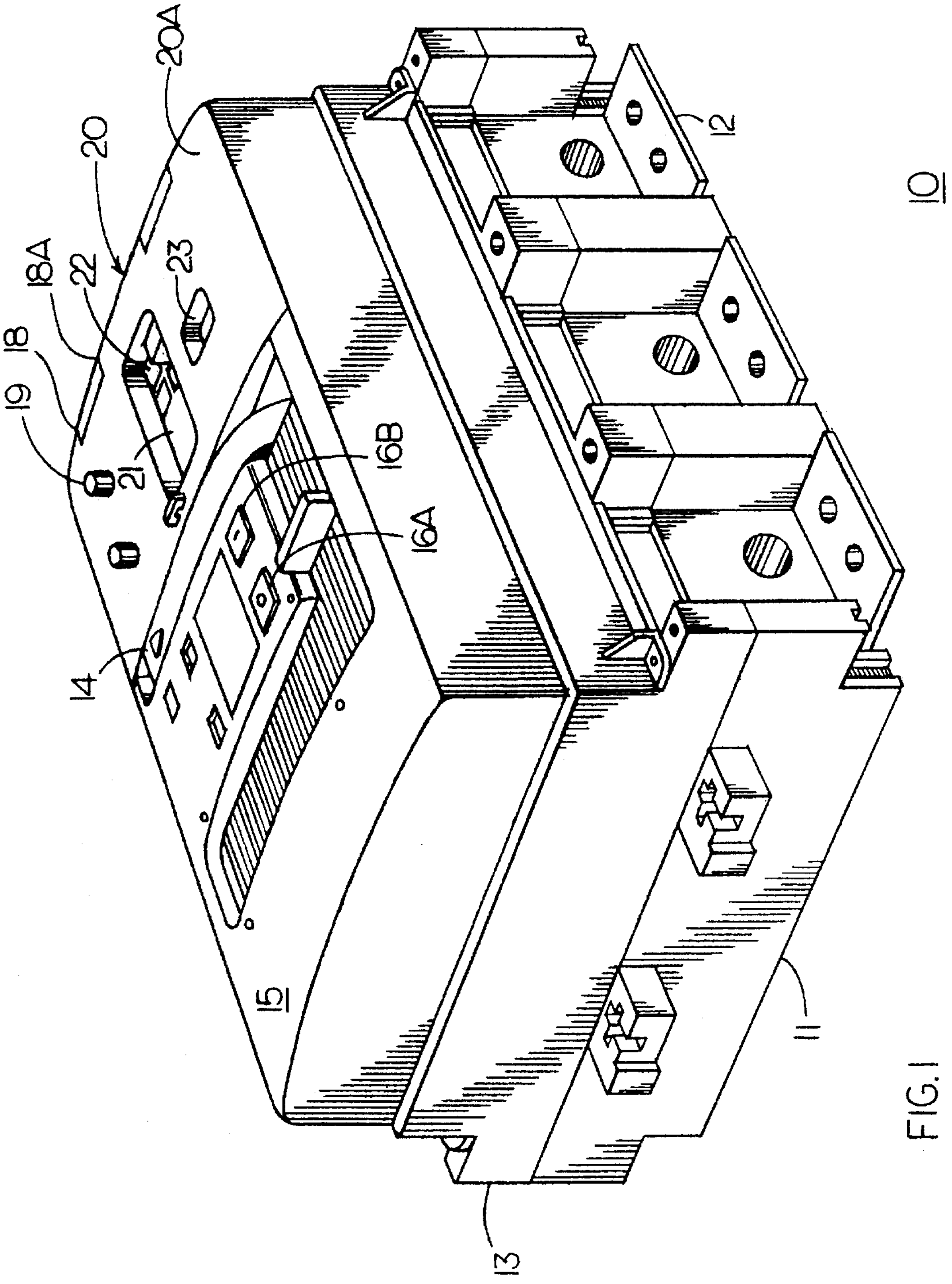
FIG. 1 is a top perspective view of a high ampere-rated circuit breaker containing the electronic trip unit assembly according to the invention.

The high ampere-rated circuit breaker 10 shown in FIG. 1 is capable of transferring several thousand amperes quiescent circuit current at several hundred volts potential without overheating. The circuit breaker consists of an electrically insulated base 11 to which an intermediate cover 13 of similar insulative material is attached prior to attaching the top cover 15, also consisting of an electrically-insulative material. The trip unit cover 50 (FIG. 2) is removed to depict the accessible components in greater detail. Electrical connection with the interior current-carrying components is made by load terminal straps 12 extending from one side of the base and line terminal straps (not shown) extending from the opposite side thereof. The interior components are controlled by an electronic trip unit 20 contained within a recess 20A in the top surface of the top cover 15. The trip unit is similar to that described within the aforementioned U.S. Pat. No. 4,581,181 and interacts further with an accessory 18 contained within an abutting recess 18A. One such accessory is the bell alarm and lock-out accessory described within U.S. patent application (41PR7179) entitled "Bell Alarm and Lock-out Accessory for High Current Circuit Breakers" which includes a combined indicator and reset button 19 extending from the top thereof. The trip unit includes a display 21 for indicating the stored trip parameters along with the nature and time of the trip occurrence. The key pad 22 allows the circuit breaker memory elements to be accessed for the trip parameters. The rating plug 23 allows the circuit breaker ampere rating to be set in the manner described within U.S. Pat. No. 4,728,914. A battery compartment cover 24 (FIG. 2) allows access to the auxiliary power batteries 31 (FIG. 3) that are described within the aforementioned U.S. patent application Ser. No. 08/200,048 filed Feb. 22, 1994 entitled "Digital Circuit Interrupter with Batter Back-up Facility". An operating handle 14 provides means for manually resetting the circuit breaker operating mechanism after a circuit interruption as well as for moving the circuit breaker contacts between their OPEN and CLOSED positions. Buttons 16A, 16B allow the operator to open and close the circuit breaker operating mechanism.

Figure 2:
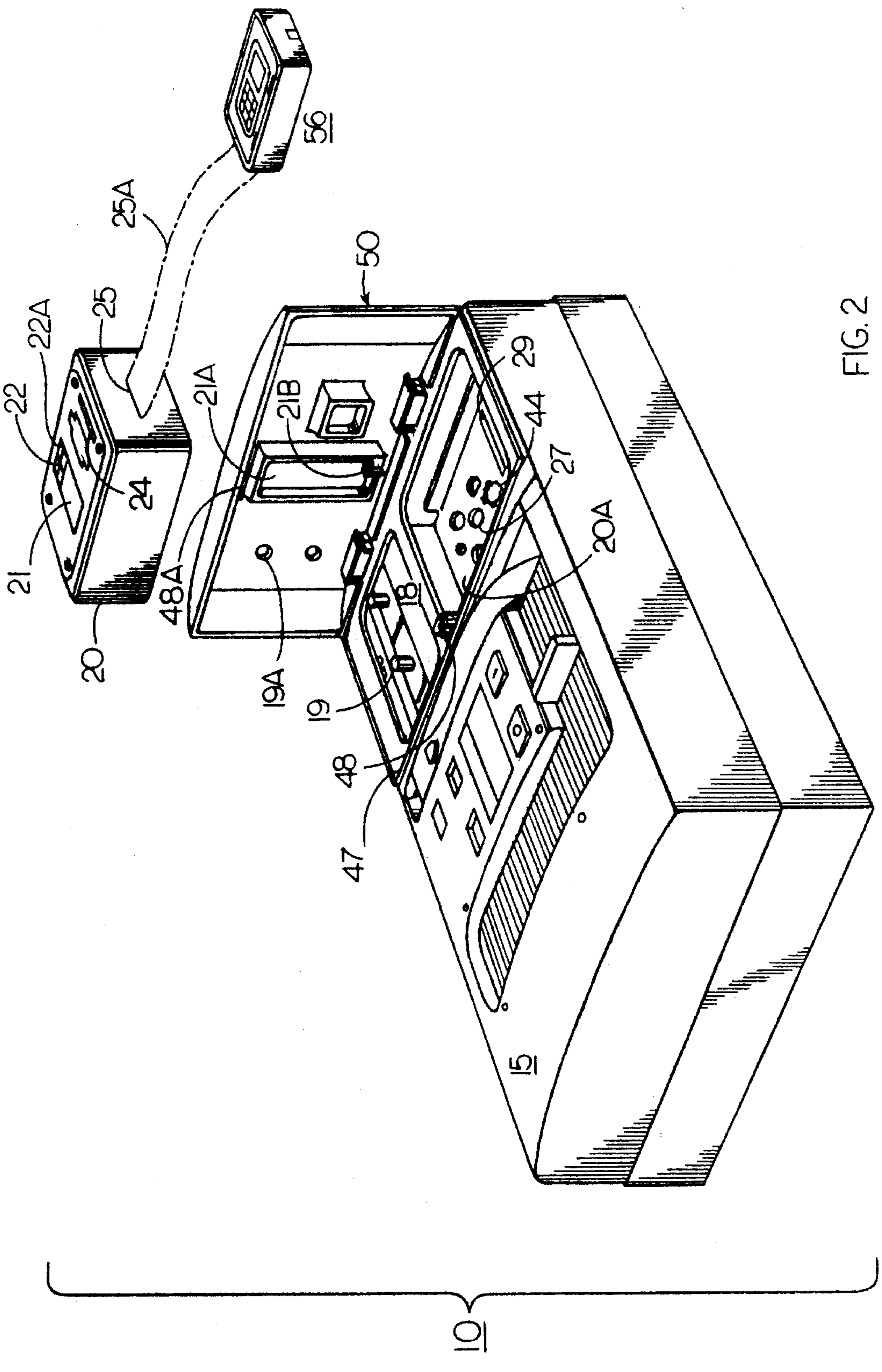
FIG. 2 is a top perspective view of the circuit breaker of FIG. 1 with the trip unit assembly in isometric projection.

As best seen by referring to FIG. 2, the circuit breaker 10 includes a trip unit door 50 that hingeably attaches to the top cover 15 which includes a perimetric rim 47 that extends around the bell alarm and lock-out accessory and trip unit 20 to prevent unauthorized access by means of the locking hasp 48 extending therefrom. The slot 48A in the door 50 receives the hasp which can then receive a padlock to secure the door in a closed position. The indicator-reset button 19 passes through the opening 19A in the door for both visual and manual access. When the trip unit 20 is inserted within the trip unit recess 20A, the display 21 is seen through the rectangular display slot 21A formed in the cover 50 with the key pad 22 also accessible except for the "enter"key, which is designated 22A. This allows the set points to be viewed on the display but prevents any unauthorized changes to the set points. The provision of the step 21B on the edge of the display slot 21A is an important feature of the invention.

Figure 4:
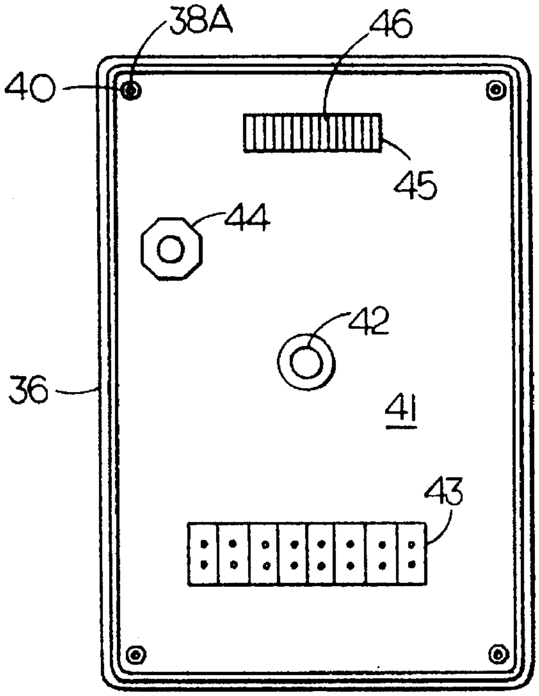
FIG. 4 is a rear view the trip unit assembly depicted in FIG. 3.

To allow for remote operation of the trip unit 20, a terminal plug connector 25 is arranged on one side for accepting a ribbon cable 25A, as indicated in phantom. The opposite end of the cable is attached to a remote display module 56. A terminal connector 43 as shown in FIG. 4 is arranged on the rear surface 41 of the trip unit case 36 for connecting with the terminal recptacle 29 (FIG. 2) when the trip unit is inserted within the trip unit recess 20A. Still referring to FIG. 2 and FIG. 4, the tapered lug 42 extending from the rear of the trip unit 20 is received in a corresponding interlock aperture 27 within the bottom of the trip unit recess 20A to hold the trip unit securely to the circuit breaker. The trip unit is keyed to the circuit breaker ampere rating by means of the octagonal stud 44 extending from the rear of the trip unit that is received within the corresponding octagonal aperture 44 within the bottom of the trip unit recess 20A. The size, number or shape of the studs and apertures determines which trip units correspond the correspondingly rated circuit breakers. The location of the dip switch array 45 containing the dip switches 46 to select the accessories on the rear surface of the trip unit case is an additional feature of the invention which serves to prevent access to the dip switches when the trip unit is within the trip unit recess and hence prevent unauthorized access to the dip switches for changing the accessory selection.

Figure 3:
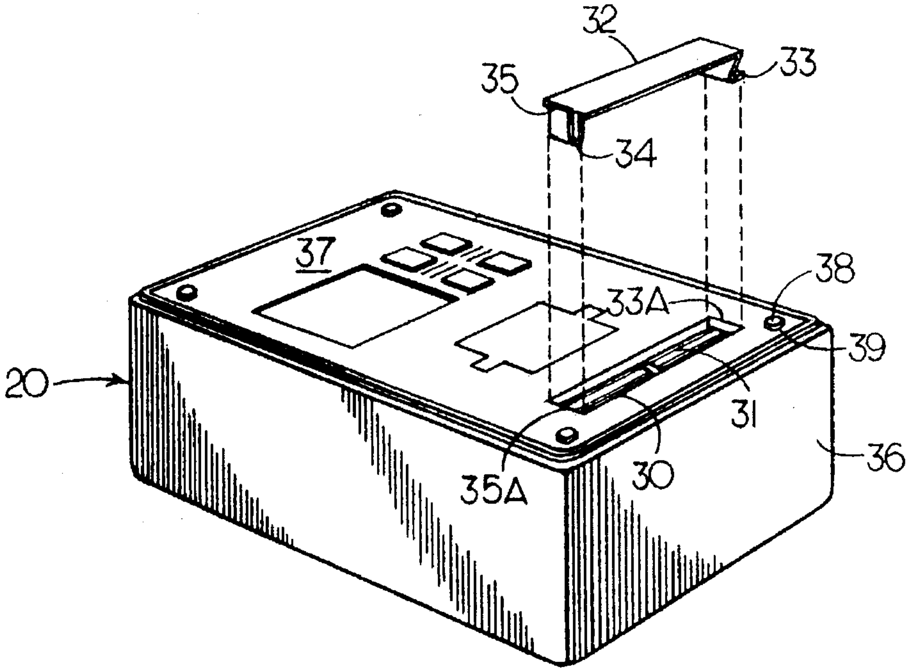
FIG. 3 is a top perspective view of the circuit breaker of FIG. 1 with the trip unit battery access cover in isometric projection.

The provision of a snap-fit battery compartment door 32 to cover the battery compartment 30 formed within the cover 37 of the trip unit 20 is shown in FIG. 3. The compartment door 32 includes an integral off-set hinge tab 33 which is captured within a corresponding rectangular slot 33A at one end of the battery compartment and a U-shaped locking tab 34 with an end 35 extending above the door for access during insertion and removal thereof within the corresponding rectangular slot 35A at the opposite end of the compartment. As fully described within the aforementioned U.S. patent application Ser. No. 08/200,248 the batteries 31 within the battery compartment 30 can be solar powered. To provide access to ambient light for battery charging function, the compartment door 32 can be fabricated from a transparent plastic material. To prevent removal of the trip unit cover 37 from the trip unit case 36, flat-ended threaded studs 38 are set within recess 39 and are fastened to the rear surface 41 of the trip unit case 36 by engaging the threaded ends 38A extending, through the rear surface 41 with locking nuts 40, as shown in FIG. 4.

A trip unit arrangement has herein been described having means for preventing access to the circuit breaker components as well as the trip unit per se. A remote indication of the status of the trip unit is also provided by means of a ribbon cable connection between the trip unit and a remote keypad and display.

We claim:

1. An industrial-rated circuit breaker for high level overcurrent protection comprising:

an insulative circuit breaker cover 15 arranged on an insulative base 11;

an electronic trip unit 20 within a trip unit recess 20A in said circuit breaker cover for interrupting circuit current upon occurrence of an overcurrent condition, said trip unit including a keypad 22 and display 21 for entering and displaying overcurrent set points, said trip unit defining a trip unit cover 37 attached to a trip unit case 36, said keypad and display being arranged under said trip unit cover; and an additional trip unit cover 50 hinged to said circuit breaker cover, said additional trip unit cover including an access slot 21A over said keypad and display, said access slot including means for preventing access to an entry key 22A on said keypad.

2. The industrial-rated circuit breaker of claim 1 including an accessory recess 18A in said circuit breaker cover including an accessory 18 in said accessory recess.

3. The industrial-rated circuit breaker of claim 2 wherein said trip unit cover includes an opening 19A for accessing means extending from said accessory.

4. The industrial-rated circuit breaker of claim 3 wherein said means comprises a reset button 19.

5. The industrial-rated circuit breaker of claim 1 further including a rating plug 23 within said trip unit cover, said trip unit cover including an opening 54 for accessing said rating plug.

6. The industrial-rated circuit breaker of claim 1 including a rear terminal connector 43 on a rear surface 41 of said trip unit case and a rear terminal receptacle 29 within said trip unit recess, said rear terminal connector being received within said rear terminal receptacle for electrical connection with electrical components within said circuit breaker cover.

7. The industrial-rated circuit breaker of claim 1 including a battery compartment 30 within said trip unit cover and a battery 31 within said compartment, said compartment further including a compartment cover 32 removably attached thereto.

8. The industrial-rated circuit breaker of claim 7 wherein said compartment cover comprises a rectangular configuration conforming to said compartment and including an offset hinge tab 33 at one end and a U-shaped locking tab 34 at an opposite end thereof, said hinge tab being received within a corresponding hinge slot 33A at said one end and said locking tab being received within a corresponding locking slot 35A at said opposite end.

9. The industrial-rated circuit breaker of claim 1 including an end terminal connector 25 on one end of said trip unit case arranged for remotely connecting said trip unit with a remote keypad and display 29.

10. The industrial-rated circuit breaker of claim 6 wherein said trip unit case is fastened to said trip unit cover by means of a stud 38 having a planar end within a recess 39 in trip unit cover, and a threaded end 38A secured to said rear surface of said trip unit case for preventing removal of said trip unit case from said trip unit cover when said trip unit is within said trip unit recess.

11. The industrial-rated circuit breaker of claim 1 including a shaped protrusion 44 extending from said rear surface of said trip unit case for reception within a corresponding shaped aperture 28 within said circuit breaker cover for insuring that a rated trip unit is connected with a similar rated circuit breaker.

12. The industrial-rated circuit breaker of claim 1 including a connector stud 42 extending from said rear surface of said trip unit case for reception within a connector aperture 27 within said circuit breaker cover for mechanically attaching said trip unit to said circuit breaker cover.

13. An electronic trip unit 20 for interrupting circuit current upon occurrence of an overcurrent condition through an industrial-rated circuit breaker for high level overcurrent protection comprising:

a keypad 22 and a display 21 for entering and displaying overcurrent set points, said trip unit defining a trip unit cover 37 attached to a trip unit case 36, said keypad and display being partly arranged under said trip unit cover;

a rating plug 23 within said trip unit cover, said trip unit cover including an opening 54 for accessing said rating plug; and a rear terminal connector 43 on a rear surface 41 of said trip unit case, said rear terminal connector being received within a rear terminal receptacle within a recess formed on a top of said circuit breaker.

14. The electronic trip unit of claim 13 including a battery compartment 30 within said trip unit cover and a battery 31 within said compartment, said compartment further including a compartment cover 32 removably attached thereto.

15. The electronic trip unit of claim 13 wherein said compartment cover comprises a rectangular configuration conforming to said compartment and including an offset hinge tab 33 at one end and a U-shaped locking tab 34 at an opposite end thereof, said hinge tab being received within a corresponding hinge slot 33A at said one end and said locking tab being received within a corresponding locking slot 35A at said opposite end.

16. The electronic trip unit of claim 13 including an end terminal connector 25 on one end of said trip unit case arranged for remotely connecting said trip unit with said terminal receptacle.

17. The electronic trip unit of claim 13 wherein said trip unit case is fastened to said trip unit cover by means of a stud 38 having a planar end within a recess 39 in trip unit cover, and a threaded end 38A secured to said rear surface of said trip unit case for preventing removal of said trip unit case from said trip unit cover when said trip unit is within said trip unit recess.

18. The electronic trip unit of claim 13 including a shaped protrusion 44 extending from said rear surface of said trip unit case for reception within a corresponding shaped aperture 28 within said circuit breaker cover for preventing a rated trip unit from connected with a dissimilar rated circuit breaker.

19. The electronic trip unit of claim 13 The including a connector stud 42 extending from said rear surface of said trip unit case for reception within a connector aperture 27 within said circuit breaker cover for mechanically attaching said trip unit to said circuit breaker cover.

* * * * *